United States Patent
Bin et al.

(10) Patent No.: US 11,055,123 B1
(45) Date of Patent: Jul. 6, 2021

(54) SYSTEM, METHOD, AND COMPUTER PROGRAM FOR PROVIDING AN ULTRA-HIGH AVAILABILITY CLOUD EMULATOR IN A MULTI-TENANT SAAS ENVIRONMENT CONTROLLED BY ANOTHER PARTY

(71) Applicant: Odaseva Technologies SAS, Neuilly-sur-Seine (FR)

(72) Inventors: Sovane Bin, San Francisco, CA (US); Saddek Dekoum, Ris Orangis (FR); Raphaël Fonrouge, Chatenay Malabry (FR)

(73) Assignee: Odaseva Technologies SAS, Neuilly-sur-Seine (FR)

( * ) Notice: Subject to any disclaimer, the term of this patent is extended or adjusted under 35 U.S.C. 154(b) by 0 days.

(21) Appl. No.: 17/065,452

(22) Filed: Oct. 7, 2020

(51) Int. Cl.
*G06Q 20/34* (2012.01)
*G06F 9/455* (2018.01)
*G06F 9/54* (2006.01)

(52) U.S. Cl.
CPC .......... *G06F 9/45508* (2013.01); *G06F 9/547* (2013.01)

(58) Field of Classification Search
CPC .............................. G06F 9/45508; G06F 9/547
See application file for complete search history.

(56) References Cited

U.S. PATENT DOCUMENTS

| | | | |
|---|---|---|---|
| 2017/0025040 A1* | 1/2017 | Maturana | G05B 17/02 |
| 2017/0048252 A1* | 2/2017 | Straub | H04L 67/06 |
| 2020/0067772 A1* | 2/2020 | Tomkins | H04L 41/145 |
| 2020/0082890 A1* | 3/2020 | Karr | G06F 3/0679 |

* cited by examiner

*Primary Examiner* — Doon Y Chow
*Assistant Examiner* — Abdou K Seye
(74) *Attorney, Agent, or Firm* — Lessani Law Group, PC (57) ABSTRACT

The present disclosure relates to a system, method, and computer program for providing an ultra-high availability cloud emulator of an entity's data in a multi-tenant SaaS environment that is not controlled by the entity. The system extracts metadata related to the entity's data and user interface in the multi-tenant SaaS environment. The metadata is used to identify and extract data records for an entity from the multi-tenant SaaS environment, as well as to ascertain functional aspects of the entity user interface in the multi-tenant SaaS environment. A cloud emulator of the entity's data records and user interface in the multi-tenant SaaS environment is created using the extracted data records and metadata, where the cloud emulator is outside the multi-tenant SaaS environment. The entity is able to access the cloud emulator at the entity's discretion as a failover for the entity's data records in the multi-tenant SaaS environment and to modify the entity's data records in the cloud emulator.

18 Claims, 6 Drawing Sheets

Method for Providing an Ultra-High Availability Cloud Emulator of an Entity's Data in a Multi-Tenant SaaS Environment

Extract metadata related to entity's data records and user interface in a multi-tenant SaaS environment, where a variety of data objects and data fields are used by the different tenants in the multi-tenant SaaS environment.
110

↓

Use the metadata to identify the data objects, data fields, and relationships between data objects used by the entity in the multi-tenant SaaS environment.
120

↓

Identify the data objects and data fields that will be available in the UHA cloud emulator.
130

↓

Extract data records for the identified data objects and data fields from the multi-tenant SaaS environment.
140

↓

Write the extracted data records and relationships between data objects to one or more databases in the cloud emulator.
150

Accessing and Modifying Data Records in the Cloud Emulator

Enable the entity to access the cloud emulator at the entity's discretion as a failover to the multitenant SaaS environment and to modify the entity's data in the cloud emulator.
210

Receive modifications (additions, edits, and/or deletions) to the entity data in the cloud emulator.
220

Modify the entity data in the cloud emulator accordingly.
230

Receive an indication from the entity to synchronize the modifications to the data records in the cloud emulator with the entity's data records in the multi-tenant, SaaS environment.
240

Compare the data records in the multi-tenant SaaS environment and the cloud emulator to identify differences.
250

Display data modifications for adminstrative review and approval.
260

Example Software Architecture

SYSTEM, METHOD, AND COMPUTER PROGRAM FOR PROVIDING AN ULTRA-HIGH AVAILABILITY CLOUD EMULATOR IN A MULTI-TENANT SAAS ENVIRONMENT CONTROLLED BY ANOTHER PARTY

BACKGROUND OF THE INVENTION

1. Field of the Invention

This invention relates generally to providing ultra-high availability of an entity's data in a multi-tenant SaaS environment, and, more specifically, to providing an ultra-high availability cloud emulator of an entity's data in a multi-tenant SaaS environment controlled by another party.

2. Description of the Background Art

Companies and other enterprises often license software from various vendors for different business and operational purposes. Traditionally, enterprise licensees ran all software and stored their data on their own servers, which were under their own control. They often would run the software and store their data on both a main server and a failover server, where the failover server would take over if the main server went down. Because the licensees owned and controlled the infrastructure, they could control when the failover server was activated.

Now many enterprise software vendors offer "software as a service" ("SaaS") in which the vendor runs the software and stores customer data "in the cloud." Most SaaS platforms are multi-tenant environments in that customers share the underlying infrastructure (e.g., the servers and databases that the power the software service). For example, a SaaS provider may host thousands or tens of thousands of customers at a single point of deployment. Examples of SaaS providers include SALESFORCE, ORACLE, and MICROSOFT. SaaS customers do not own or control the infrastructure on which the software is run and on which their data is stored. They just have access to the service.

While SaaS providers have redundancy and failover mechanisms in the event of a failure, the activation of the failover is under the control of the SaaS provider and not the customer of the SaaS provider. As SaaS providers in a multi-tenant environment group thousands or tens of thousands of customers at a point of deployment, they likely will only activate the failover if it appears the point of deployment will be down for a significant period of time and, even then, once the failover is activated, it would take time to migrate all of the customers from the failed point of deployment. Twelve hours is the industry-standard time frame for a failover to take effect in a SaaS environment, but, in reality, it can often take anywhere from 24-48 hours.

Furthermore, in any given year, there are usually periods of time were the SaaS environment is down for maintenance or other issues. This typically ranges from 8-17 hours, but it can last longer. There may also be periods of time when entities have read-only capabilities for their data in the SaaS environment and do not have write capabilities.

For many entities, while inconvenient, this is not a business-critical issue. However, there are some entities, such as entities that use the SaaS service to provide emergency medical care, that require ultra-high availability (e.g., 99.99% or 99.999% uptime). Therefore, at least for certain entities, there is a demand for a solution that would provide ultra-high availability (with both read and write functionality) for the entity's data in a third-party, multi-tenant SaaS environment and that would provide the entity with both failover and failback activation control.

SUMMARY OF THE DISCLOSURE

The present disclosure relates to a system, method, and computer program for providing an ultra-high availability cloud emulator of an entity's data in a multi-tenant, SaaS environment that is not controlled by the entity. The system extracts metadata related to an entity's data and user interface in the multi-tenant SaaS environment. The metadata is used to identify and extract data records for the entity from the multi-tenant SaaS environment, as well as to ascertain functional aspects of the entity's user interface in the multi-tenant SaaS environment. The system uses the extracted metadata and data records to create a cloud emulator of the entity's data records and user interface in the multi-tenant SaaS environment, where the cloud emulator is outside the multi-tenant SaaS environment. The entity is then able to access the cloud emulator at the entity's discretion as a failover for the entity's data in the multi-tenant SaaS environment and to modify the entity's data records in the cloud emulator.

In one embodiment, a method, performed by a computer system, for providing an ultra-high availability cloud emulator of an entity's data in a multi-tenant SaaS environment comprises the following steps:
   extracting metadata related to an entity's data records and user interface in a multi-tenant SaaS environment, wherein a variety of data objects and data fields are used by the different tenants, and wherein the entity does not have control over the infrastructure on which the multi-tenant SaaS environment is provided;
   using the metadata to identify the data objects, data fields, and relationships between data objects used by the entity in the multi-tenant SaaS environment;
   identifying the entity data to extract from the multi-tenant SaaS environment based on the data objects, data fields, and relationships between data objects used by the entity;
   extracting data records for the identified entity data from the multi-tenant SaaS environment;
   creating a cloud emulator of the entity's data records and user interface in the multi-tenant SaaS environment using the extracted data records and the metadata, wherein the cloud emulator is outside the multi-tenant SaaS environment, and wherein creating the cloud emulator comprises:
      using the metadata to identify page view contents, navigation, search capabilities, and security settings of the entity's user interface in the multi-tenant SaaS environment;
      generating a user interface that emulates the page view contents, navigation, search capabilities, and security settings of the entity's user interface in the multi-tenant SaaS environment; and
      writing the extracted data records and data related to relationships between the entity's data objects to one or more databases in the cloud emulator; and
   enabling the entity to access the cloud emulator at the entity's discretion as a failover for the entity's data records in the multi-tenant SaaS environment and to modify the entity's data records in the cloud emulator.

DETAILED DESCRIPTION OF THE PREFERRED EMBODIMENTS

The present disclosure relates to a system, method, and computer program for providing an ultra-high availability (UHA) cloud emulator of an entity's data in a multi-tenant SaaS environment, where the multi-tenant SaaS environment is not controlled by the entity. A cloud emulator is a cloud-based platform that emulates an entity's data records and user interface (UI) in the multi-tenant SaaS environment. The cloud emulator provides the entity with ultra-high availability and failover control despite the fact that the entity does not control the infrastructure (e.g., servers, databases, and software code) of the multi-tenant SaaS environment. The method is performed by a computer system.

Example implementations of the method are described in more detail with respect to FIGS. 1-4.

Figure 1A:
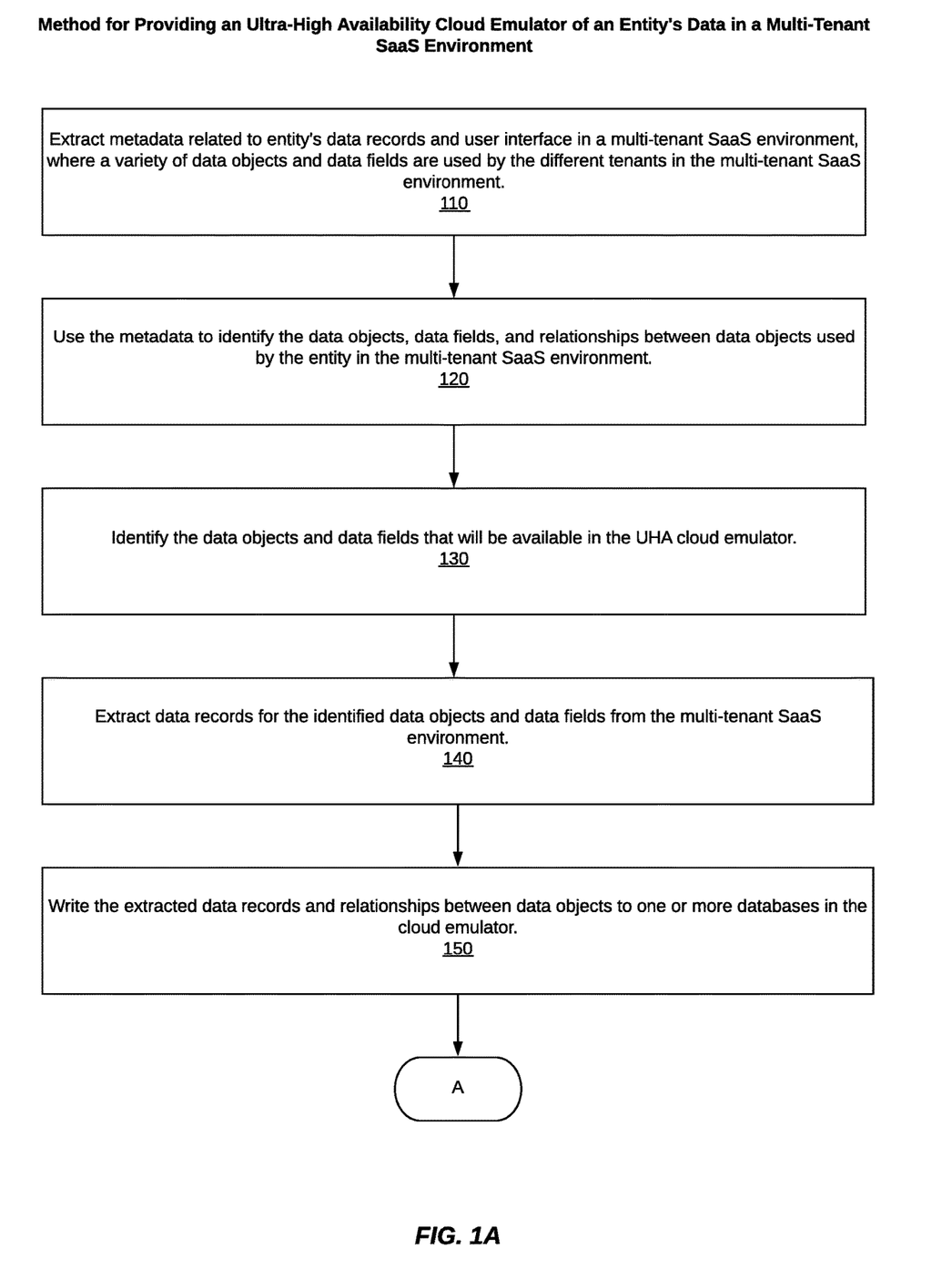
FIGS. 1A-1B are flowcharts that illustrate a method, according to one embodiment, for providing an ultra-high availability cloud emulator of an entity's data records in a multi-tenant SaaS environment.
Figure 1B:
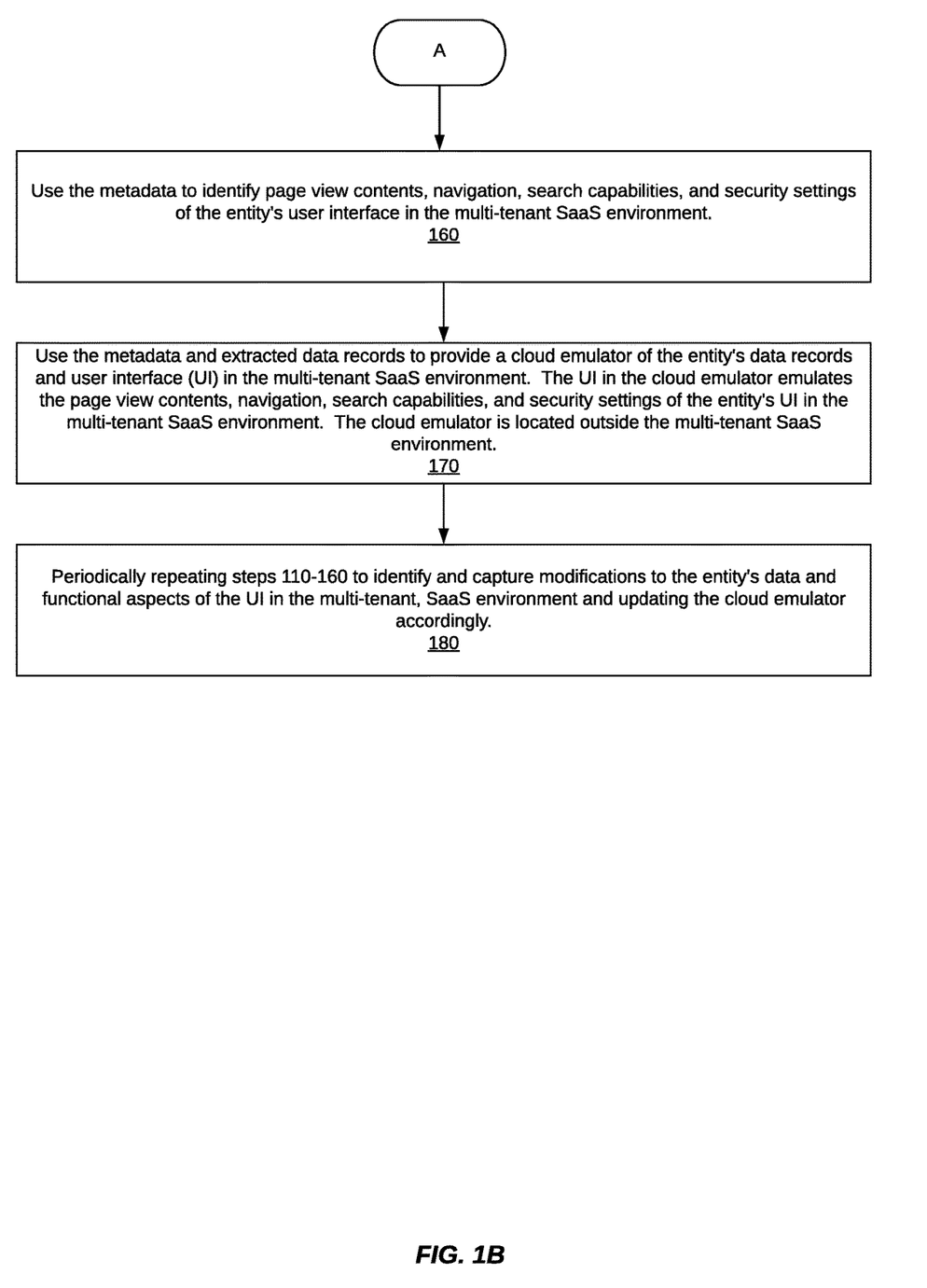

1. Method for Providing an Ultra-High Availability Cloud Emulator of an Entity's Data in a Multi-Tenant SaaS Environment FIGS. 1A-1B illustrate a method for providing an ultra-high availability cloud emulator of an entity's data in a multi-tenant SaaS environment, where the entity does not have control over the infrastructure on which the multi-tenant SaaS environment is provided.

1.1. Identifying the Data Objects and Fields Used by the Entity in the Multi-Tenant SaaS Environment The system extracts metadata related to an entity's data records and user interface in a multi-tenant SaaS environment (step 110). As a variety of data objects and data fields are used by the different tenants in the multi-tenant SaaS environment, the system uses the metadata to identify the specific data objects and corresponding data fields used by the entity in the multi-tenant SaaS environment and to determine the relationships between the entity's data objects (step 120).

1.2 Determining which Data Objects and Fields from the Multi-Tenant SaaS Environment Will be Available in the Cloud Emulator The system then identifies which of the entity's data objects and data fields will be available in the UHA cloud emulator (step 130). In certain embodiments, step 130 is performed by providing an administrative interface in which the data objects and fields identified from the metadata are listed. An administrator for the entity is then able to select which of the listed data objects and data fields will be available in the cloud emulator (e.g., the administrator may check boxes for the data objects and fields to be duplicated in the emulator). In other embodiments, the system may automatically select all data objects and data fields, or it may apply one or more rules to determine which data objects and data fields to make available in the cloud emulator.

1.3 Creating the Cloud Emulator

The system extracts data records for the selected data objects and data fields from the multi-tenant SaaS environment (step 140). The system writes the extracted data records and relationships between data objects to one or more databases in the cloud emulator (step 150). The data records are stored in a way that they can easily be queried. In one embodiment, data records are written to a SQL database. This type of database is easily queried and allows it to create indexes for performance purposes.

To functionally emulate the entity's user interface in the multi-tenant SaaS environment, the system uses the extracted UI-related metadata to identify page view contents, navigation, search capabilities, and security settings of the entity's user interface in the multi-tenant SaaS environment (step 160). The system is able to obtain information on the page view contents, navigation, search capabilities, and security settings, because the SaaS provider has APIs that allow this information to be exposed. The system then uses the metadata and extracted data records to provide a cloud emulator of the entity's data records and user interface in the multi-tenant SaaS environment (step 170). While it may not look exactly the same as the user interface in the multi-tenant SaaS environment, the user interface in the cloud emulator functionally emulates the page view contents, navigation, search capabilities, and security settings of the entity's user interface in the multi-tenant SaaS environment.

There are a number of ways in which the cloud emulator may provide ultra-high availability for the entity data. For example, the cloud emulator may operate in a different location and be hosted by a different cloud services provider than the provider of the multi-tenant SaaS environment (e.g., AMAZON WEB SERVICES AND/OR MICROSOFT AZURE vs. SALESFORCE), which helps to provide ultra-high availability if the multi-tenant SaaS environment fails or is otherwise inaccessible. Also, the cloud emulator may run on a cloud service platform that provides service level agreements (SLAs) that guarantee for higher uptimes than the multi-tenant SaaS environment. Furthermore, the cloud emulator may be duplicated across multiple platforms in different geographic locations.

The system periodically repeats steps 110-160 to identify and capture any modifications to the entity's data and functional aspects of the user interface in the multi-tenant SaaS environment, and it updates the cloud emulator accordingly (step 180). In the subsequent rounds, the system may use the metadata to identify the incremental changes and retrieve only the data records that have changed.

2. Method for Accessing and Modifying Data Records in the Cloud Emulator

Figure 2A:
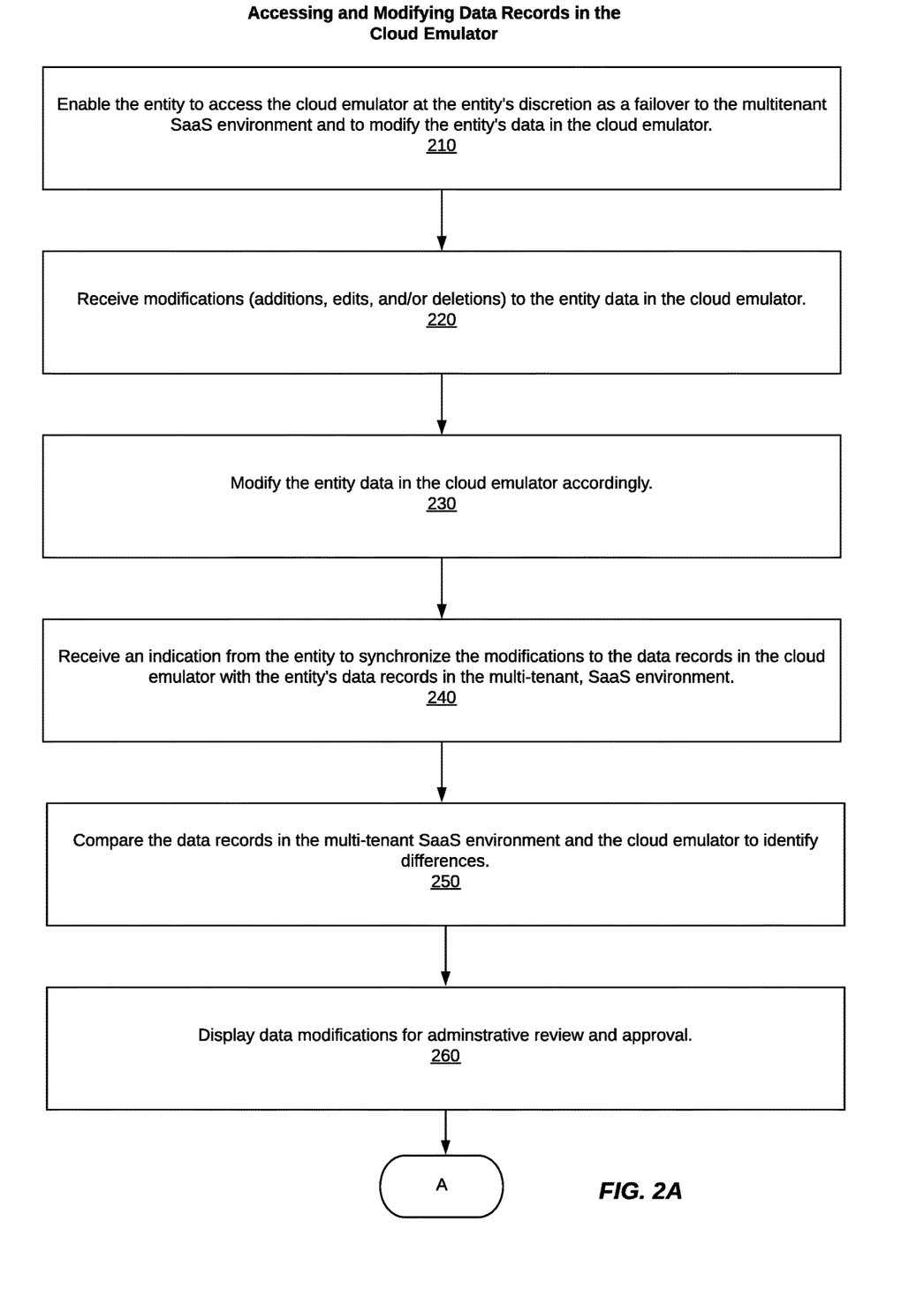
FIGS. 2A-2B are flowcharts that illustrate a method, according to one embodiment, for accessing and modifying data records in the cloud emulator.
Figure 2B:
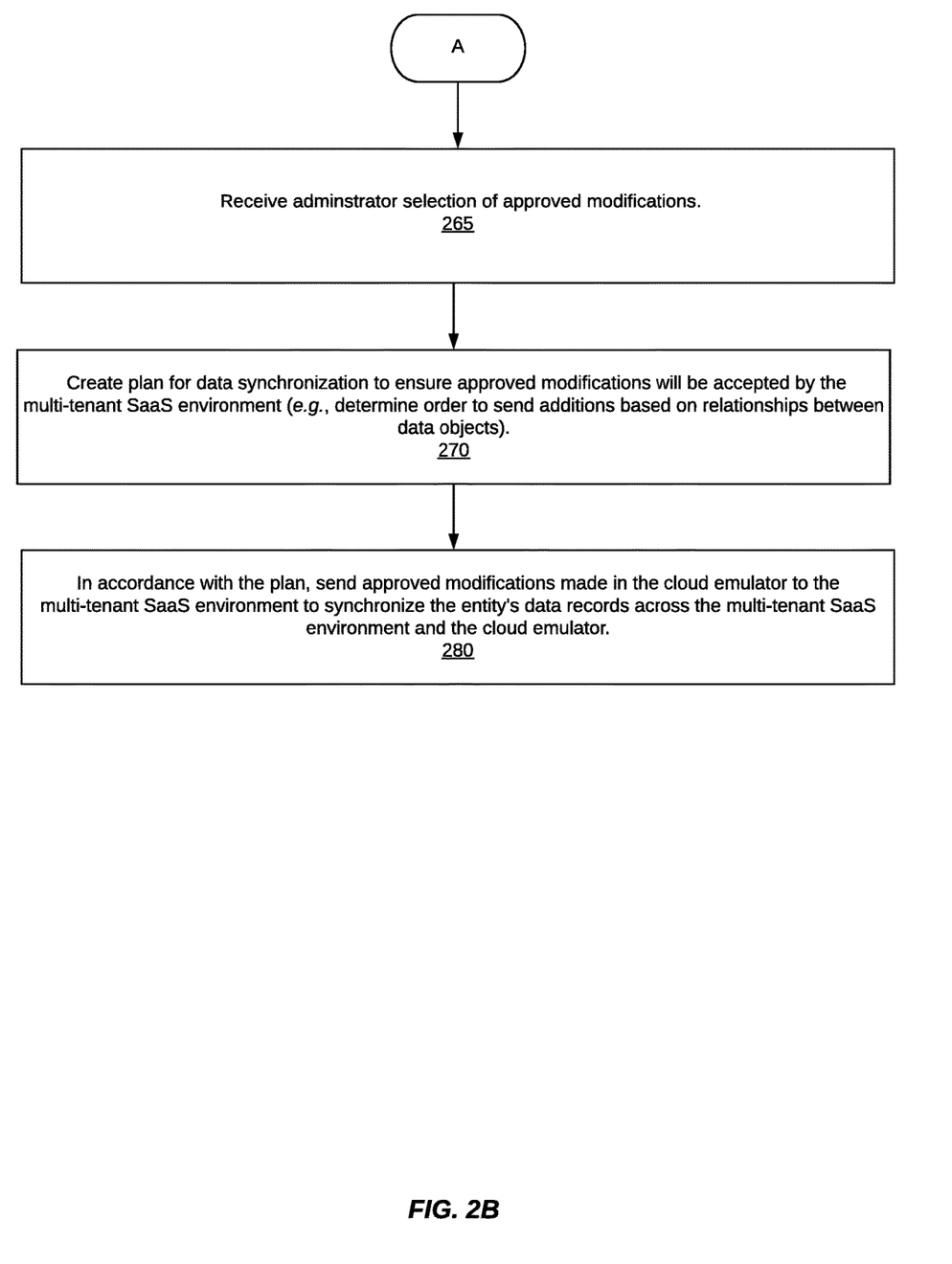

FIGS. 2A-2B illustrate a method for accessing and modifying data records in the cloud emulator. The system enables the entity to access the cloud emulator at the entity's discretion as a failover for the entity's data in the multi-tenant SaaS environment and to modify the entity's data in the cloud emulator (step 210). As stated above, the entity controls when to switch from the multitenant SaaS environment to the cloud emulator. In certain embodiments, the system provides a user interface in which an administrator can select to failover to the cloud emulator. In other embodiments, the administrator can configure the system to automatically failover when it detects the SaaS environment is down.

In response to the entity failing over to the cloud emulator (i.e., switching from the multi-tenant SaaS environment to the cloud emulator), the system receives modifications (additions, edits, and/or deletions) to the entity data in the cloud emulator (step 220). The system modifies the entity data in the cloud emulator accordingly (step 230).

At some point, for example when the multi-tenant SaaS environment is up and running again, the system receives an indication from the entity to synchronize the modifications to the data records in the cloud emulator with the entity's data records in the multi-tenant SaaS environment (step 240). The system compares the data records in the multi-tenant SaaS environment and the cloud emulator to identify differences (step 250). In one embodiment, the system extracts data records from both the multi-tenant SaaS environment and the cloud emulator. The system then compares the data extractions to identify the data differences in the two environments. The system displays data modifications for administrative review and approval (step 260). The system receives administrator selection of approved modifications (step 265).

The system creates a plan for data synchronization to ensure approved modifications will be accepted by the multi-tenant SaaS environment (step 270). In one embodiment, creating a plan comprises determining the order of data additions based on the relationship of data objects. For example, an entity has a "contact" object and an "account" object in their SaaS environment, where the "account" object is a parent object to the "contact" object. While in failover mode, the entity created a new account and added a contact for the account. In such a case, the system must first send the multi-tenant SaaS environment data for the new account, and then send the contact for the account. Creating a plan may also include applying rules to determine if any data transformations need to be made. In accordance with the plan, the system sends approved modifications made in the cloud emulator to the multi-tenant SaaS environment to synchronize the entity's data records across the multi-tenant SaaS environment and the cloud emulator (step 280).

3. Example Architecture

Figure 3:
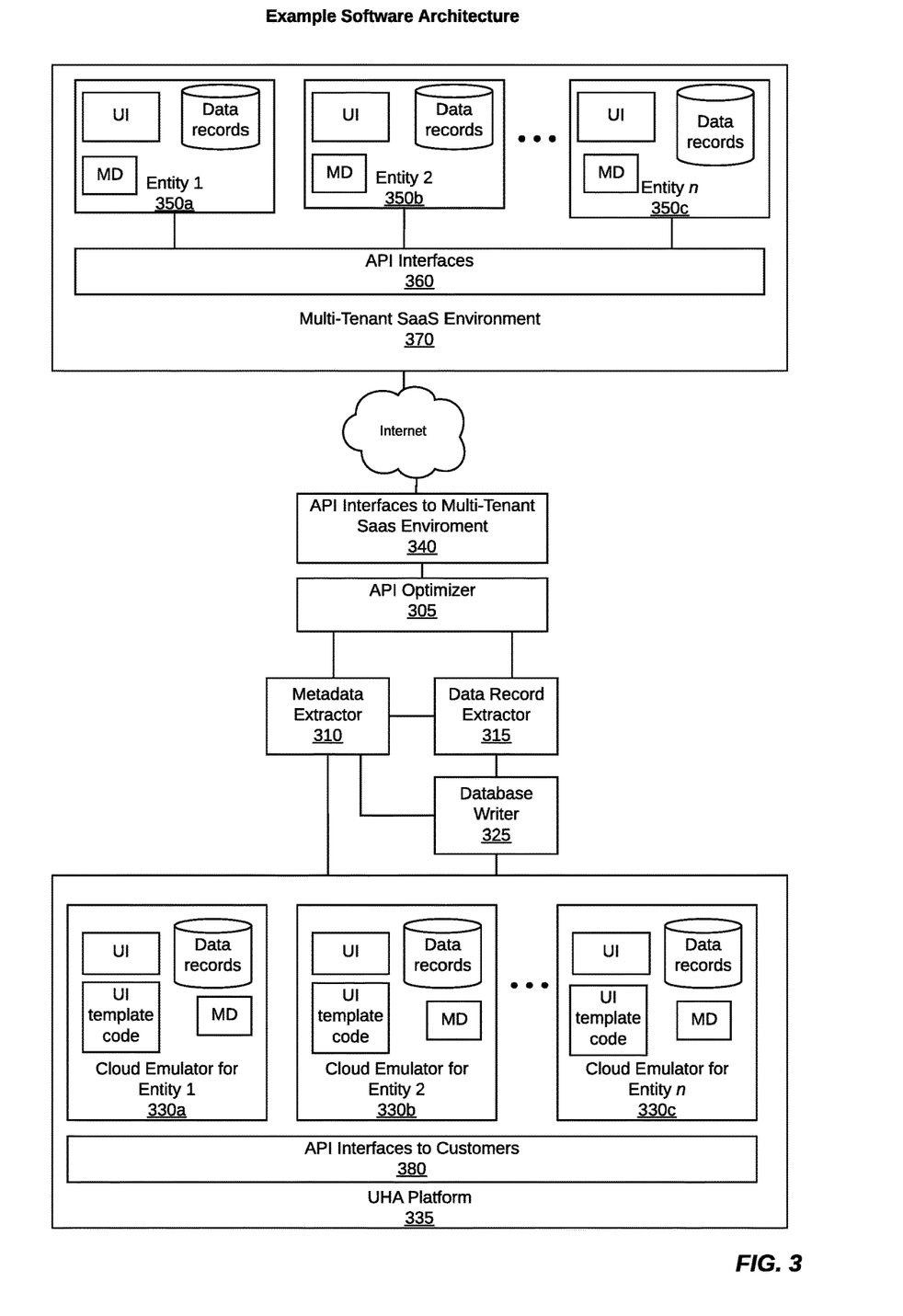
FIG. 3 is a block diagram that illustrates an example software architecture according to one embodiment.

FIG. 3 illustrates an example architecture for a system that performs the methods described herein. However, the methods described herein may be implemented in other systems and are not limited to the illustrated system. In order to obtain metadata and extract data records from a multi-tenant SaaS environment 370 via the internet, one or more API interfaces 340 interface with the API interfaces 360 of the multi-tenant SaaS environment 370, an API optimizer 305 distributes API requests among a plurality of APIs, a metadata extractor 310 extracts metadata, a data record extractor 315 extracts data records, and a database writer 325 writes to the database of the UHA platform 335.

Certain APIs may be more efficient for certain types of data. Therefore, the system may distribute API requests among a plurality of APIs based at least in part on the data type of the data being extracted in order to optimize efficiency. Within a single database object, the data fields may be divided up among different APIs based on the data type associated with the data fields if it reduces the overall number of API requests. This is because the system may be able to retrieve data field values for more database object rows by dividing up the API requests based on data types. It is ideal to retrieve multiple rows from the database object with one API request. However, there may be restrictions on the number of rows which can be extracted for certain data types. For example, where the data type for the data field is a file, certain APIs may limit the extraction to only one row or, in other words, one file at a time. In that case, the system may use one API to extract multiple rows of a data object, but only for a subset of fields. Other fields for the same rows, such as fields for files, may be allocated to a different API that is better suited for the fields' file types. In such cases, multiple, different API are used to extract the data for a row. Furthermore, APIs often have limits on the number of requests you can make in a certain period of time (e.g., 24 hours). Therefore, the system may also distribute the API requests among a plurality of APIs based on the API request limit to load balance the APIs and to maximize the amount of data that can be extracted in a period of time.

The UHA platform 335 hosts a cloud emulator for each entity 330a, 330b, 330c. Each cloud emulator 330a, 330b, 330c has a user interface, data records, and metadata that corresponds to the user interface, data records, and metadata for each entity in the multi-tenant SaaS environment 350a, 350b, 350c. Each cloud emulator 330a, 330b, 330c also has a user interface template that dynamically generates the user interface in the cloud emulator by applying the metadata to the user interface template software code. Both the multi-tenant SaaS environment 370 and the UHA platform 335 do not provide a separate database for each entity. Hence, while the data records are illustrated separately using database symbols with respect to each entity in both the multi-tenant SaaS environment 370 and the UHA platform 335, the data records are often shared between entities on their respective servers. In addition to a customer being able to interface with a cloud emulator 330a, 330b, 330c via the user interface for the respective emulator, a customer can also make API calls to the cloud emulator 330a, 330b, 330c via API interface 380.

In certain embodiments, the system provides a universal cloud emulator that is agnostic to the SaaS environment. In other words, the universal cloud emulator can be used by a plurality of different entities to emulate a plurality of different multi-tenant SaaS environments. For example, in a universal cloud emulator, there may be multiple API interfaces that enable a plurality of entities to interface with SALESFORCE, ORACLE, MICROSOFT, etc.

4. Dynamic UI Generation Based on Extracted Entity Metadata

Figure 4:
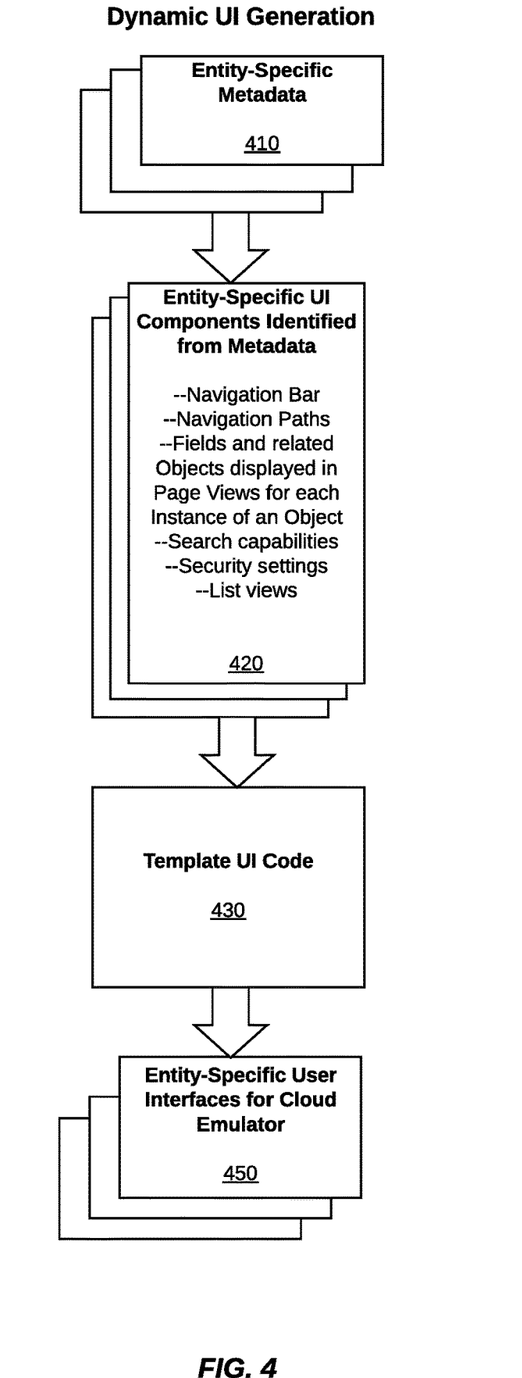
FIG. 4 is a flowchart that illustrates a method, according to one embodiment, for dynamic user interface generation.

FIG. 4 illustrates a method for dynamic user interface generation. As discussed with respect to FIG. 3, the one or more API interfaces 340 obtain entity-specific metadata from each entity via the API interfaces 360 of the multi-tenant SaaS environment 370 (step 410). The metadata extractor 310 identifies and extracts entity-specific user interface components from the metadata (step 420). These may include, but are not limited to, the navigation bar, navigation paths, data fields and related objects displayed in page views for each instance of an object, search capabilities, security settings, and list views. The user interface template dynamically generates the user interface in the cloud emulator by applying the metadata to the user interface template software code (step 430). This produces entity-specific user interfaces for each entity's cloud emulator (step 450).

5. Cloud Emulator for Preserving SaaS Data

In an alternate embodiment, instead of creating the cloud emulator for the purpose of UHA failover, it could be created to preserve an entity's data in the third-party SaaS system in order to give the entity access to the data after the entity stops subscribing to the SaaS, and the cloud emulator could be configured to be read only.

6. General

The methods described with respect to FIGS. 1A-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for providing an ultra-high availability cloud emulator of an entity's data in a multi-tenant SaaS environment, the method comprising:
   extracting metadata related to an entity's data records and user interface in a multi-tenant SaaS environment, wherein a variety of data objects and data fields are used by the different tenants, and wherein the entity does not have control over the infrastructure on which the multi-tenant SaaS environment is provided;
   using the metadata to identify the data objects, data fields, and relationships between data objects used by the entity in the multi-tenant SaaS environment;
   identifying the entity data to extract from the multi-tenant SaaS environment based on the data objects, data fields, and relationships between data objects used by the entity;
   extracting data records for the identified entity data from the multi-tenant SaaS environment;
   creating a cloud emulator of the entity's data records and user interface in the multi-tenant SaaS environment using the extracted data records and the metadata, wherein the cloud emulator is outside the multi-tenant SaaS environment, and wherein creating the cloud emulator comprises:
      using the metadata to identify page view contents, navigation, search capabilities, and security settings of the entity's user interface in the multi-tenant SaaS environment;
      generating a user interface that emulates the page view contents, navigation, search capabilities, and security settings of the entity's user interface in the multi-tenant SaaS environment; and
      writing the extracted data records and data related to relationships between the entity's data objects to one or more databases in the cloud emulator; and
   enabling the entity to access the cloud emulator at the entity's discretion as a failover for entity's data in the multi-tenant SaaS environment and to modify the entity's data records in the cloud emulator.

2. The method of claim 1, wherein the steps of extracting metadata and data records is periodically repeated to identify any subsequent changes to the entity's data objects, data fields, and functional aspects of the user interface in the multi-tenant SaaS environment and to update the cloud emulator accordingly.

3. The method of claim 1, further comprising:
   receiving modifications to the entity data in the cloud emulator and modifying the entity's data records in the cloud emulator accordingly;
   receiving an indication from the entity to synchronize the modifications to the entity's data records in the cloud emulator with the entity's data records in the multi-tenant SaaS environment; and
   synchronizing the modifications made to the entity's data records in the cloud emulator with the entity's data records in the third-party SaaS environment.

4. The method of claim 1, wherein the entity's metadata and data records in the multi-tenant SaaS environment are extracted via a plurality of APIs to the multi-tenant SaaS environment and wherein API requests are distributed among the plurality of APIs based at least in part on data type of the data being extracted.

5. The method of claim 4, wherein API requests also are distributed among the plurality of APIs based on API request limits for each of the plurality of APIs.

6. The method of claim 1, wherein the method is performed with respect to a plurality of different entities with respect to a plurality of different multi-tenant SaaS environments.

7. A non-transitory computer-readable medium comprising a computer program, that, when executed by a computer system, enables the computer system to perform the following method for providing an ultra-high availability cloud emulator of an entity's data in a multi-tenant SaaS environment, the method comprising:
   extracting metadata related to an entity's data records and user interface in a multi-tenant SaaS environment, wherein a variety of data objects and data fields are used by the different tenants, and wherein the entity does not have control over the infrastructure on which the multi-tenant SaaS environment is provided;
   using the metadata to identify the data objects, data fields, and relationships between data objects used by the entity in the multi-tenant SaaS environment;
   identifying the entity data to extract from the multi-tenant SaaS environment based on the data objects, data fields, and relationships between data objects used by the entity;
   extracting data records for the identified entity data from the multi-tenant SaaS environment;
   creating a cloud emulator of the entity's data records and user interface in the multi-tenant SaaS environment using the extracted data records and the metadata, wherein the cloud emulator is outside the multi-tenant SaaS environment, and wherein creating the cloud emulator comprises:
      using the metadata to identify page view contents, navigation, search capabilities, and security settings of the entity's user interface in the multi-tenant SaaS environment;
      generating a user interface that emulates the page view contents, navigation, search capabilities, and security settings of the entity's user interface in the multi-tenant SaaS environment; and
      writing the extracted data records and data related to relationships between the entity's data objects to one or more databases in the cloud emulator; and
   enabling the entity to access the cloud emulator at the entity's discretion as a failover for entity's data in the multi-tenant SaaS environment and to modify the entity's data records in the cloud emulator.

8. The non-transitory computer-readable medium of claim 7, wherein the steps of extracting metadata and data records is periodically repeated to identify any subsequent changes to the entity's data objects, data fields, and functional aspects of the user interface in the multi-tenant SaaS environment and to update the cloud emulator accordingly.

9. The non-transitory computer-readable medium of claim 7, further comprising:
  receiving modifications to the entity data in the cloud emulator and modifying the entity's data records in the cloud emulator accordingly;
  receiving an indication from the entity to synchronize the modifications to the entity's data records in the cloud emulator with the entity's data records in the multi-tenant SaaS environment; and
  synchronizing the modifications made to the entity's data records in the cloud emulator with the entity's data records in the third-party SaaS environment.

10. The non-transitory computer-readable medium of claim 7, wherein the entity's metadata and data records in the multi-tenant SaaS environment are extracted via a plurality of APIs to the multi-tenant SaaS environment and wherein API requests are distributed among the plurality of APIs based at least in part on data type of the data being extracted.

11. The non-transitory computer-readable medium of claim 10, wherein API requests also are distributed among the plurality of APIs based on API request limits for each of the plurality of APIs.

12. The non-transitory computer-readable medium of claim 7, wherein the method is performed with respect to a plurality of different entities with respect to a plurality of different multi-tenant SaaS environments.

13. A computer system for providing an ultra-high availability cloud emulator of an entity's data in a multi-tenant SaaS environment, the system comprising:
  one or more processors;
  one or more memory units coupled to the one or more processors, wherein the one or more memory units store instructions that, when executed by the one or more processors, cause the system to perform the operations of:
    extracting metadata related to an entity's data records and user interface in a multi-tenant SaaS environment, wherein a variety of data objects and data fields are used by the different tenants, and wherein the entity does not have control over the infrastructure on which the multi-tenant SaaS environment is provided;
    using the metadata to identify the data objects, data fields, and relationships between data objects used by the entity in the multi-tenant SaaS environment;
    identifying the entity data to extract from the multi-tenant SaaS environment based on the data objects, data fields, and relationships between data objects used by the entity;
    extracting data records for the identified entity data from the multi-tenant SaaS environment;
    creating a cloud emulator of the entity's data records and user interface in the multi-tenant SaaS environment using the extracted data records and the metadata, wherein the cloud emulator is outside the multi-tenant SaaS environment, and wherein creating the cloud emulator comprises:
      using the metadata to identify page view contents, navigation, search capabilities, and security settings of the entity's user interface in the multi-tenant SaaS environment;
      generating a user interface that emulates the page view contents, navigation, search capabilities, and security settings of the entity's user interface in the multi-tenant SaaS environment; and
      writing the extracted data records and data related to relationships between the entity's data objects to one or more databases in the cloud emulator; and
    enabling the entity to access the cloud emulator at the entity's discretion as a failover for entity's data in the multi-tenant SaaS environment and to modify the entity's data records in the cloud emulator.

14. The computer system of claim 13, wherein the steps of extracting metadata and data records is periodically repeated to identify any subsequent changes to the entity's data objects, data fields, and functional aspects of the user interface in the multi-tenant SaaS environment and to update the cloud emulator accordingly.

15. The computer system of claim 13, further comprising:
  receiving modifications to the entity data in the cloud emulator and modifying the entity's data records in the cloud emulator accordingly;
  receiving an indication from the entity to synchronize the modifications to the entity's data records in the cloud emulator with the entity's data records in the multi-tenant SaaS environment; and
  synchronizing the modifications made to the entity's data records in the cloud emulator with the entity's data records in the third-party SaaS environment.

16. The computer system of claim 13, wherein the entity's metadata and data records in the multi-tenant SaaS environment are extracted via a plurality of APIs to the multi-tenant SaaS environment and wherein API requests are distributed among the plurality of APIs based at least in part on data type of the data being extracted.

17. The computer system of claim 16, wherein API requests also are distributed among the plurality of APIs based on API request limits for each of the plurality of APIs.

18. The computer system of claim 13, wherein the method is performed with respect to a plurality of different entities with respect to a plurality of different multi-tenant SaaS environments.

* * * * *